(12) United States Patent
Meyer et al.

(10) Patent No.: US 9,046,139 B2
(45) Date of Patent: Jun. 2, 2015

(54) CLUTCH COOLING SYSTEM

(71) Applicant: Caterpillar Inc., Peoria, IL (US)

(72) Inventors: Kevin Gerard Meyer, Germantown Hills, IL (US); Jason Robert Allen, Edwards, IL (US); James Hill, Brimfield, IL (US); William McClure, Washington, IL (US)

(73) Assignee: Caterpillar Inc., Peoria, IL (US)

( * ) Notice: Subject to any disclaimer, the term of this patent is extended or adjusted under 35 U.S.C. 154(b) by 125 days.

(21) Appl. No.: 13/723,388

(22) Filed: Dec. 21, 2012

(65) Prior Publication Data

US 2014/0174876 A1 Jun. 26, 2014

(51) Int. Cl.
*F16D 13/72* (2006.01)
*F16D 25/12* (2006.01)
*F16D 25/0638* (2006.01)

(52) U.S. Cl.
CPC ............ *F16D 13/72* (2013.01); *F16D 25/0638* (2013.01); *F16D 25/123* (2013.01); *F16D 2300/0214* (2013.01)

(58) Field of Classification Search
CPC .............................................. F16D 2300/0214
USPC ...................................................... 192/70.12
See application file for complete search history.

(56) References Cited

U.S. PATENT DOCUMENTS

| | | | |
|---|---|---|---|
| 3,954,028 A * | 5/1976 | Windish | 475/328 |
| 4,458,793 A * | 7/1984 | Riese et al. | 192/12 A |
| 4,751,989 A * | 6/1988 | Shinokawa et al. | 192/13 R |
| 5,421,439 A | 6/1995 | Hayasaki | |
| 5,988,335 A | 11/1999 | Kupferschmid et al. | |
| 6,202,814 B1 | 3/2001 | Braford, Jr. | |
| 6,244,407 B1 | 6/2001 | Kremer et al. | |
| 6,401,896 B1 * | 6/2002 | Schnepf | 192/70.12 |
| 6,945,371 B2 | 9/2005 | Schmidt | |
| 7,308,977 B2 | 12/2007 | Maguire et al. | |
| 8,087,506 B2 | 1/2012 | Haupt | |
| 2004/0154894 A1* | 8/2004 | Braford et al. | 192/70.12 |
| 2005/0205373 A1 | 9/2005 | Foster et al. | |
| 2011/0000757 A1 | 1/2011 | Muizelaar et al. | |

FOREIGN PATENT DOCUMENTS

EP 1079130 2/2001

* cited by examiner

*Primary Examiner* — Ramya Burgess
*Assistant Examiner* — Mark Manley
(74) *Attorney, Agent, or Firm* — BakerHostetler (57) ABSTRACT

A transmission clutch cooling system includes a clutch housing defined between a drive hub of a drive member and a clutch hub of a driven member and a clutch assembly housed in the clutch housing. The clutch hub includes a hub deck having a plurality of bores therethrough, an inner annulus extending axially from the hub deck, and an outer annulus extending axially from the hub deck, the outer annulus including a plurality of radial orifices therethrough and a lip flange extending from a distal end towards the inner annulus. The clutch assembly includes a plurality of clutch plates secured to the drive hub and a plurality of friction plates secured to the driven member. A piston assembly is provided for engaging or disengaging the plurality of friction plates against the plurality of clutch plates to cause or release integrated rotation of the drive member and the driven member.

20 Claims, 8 Drawing Sheets

CLUTCH COOLING SYSTEM

TECHNICAL FIELD

The disclosure relates to transmission clutches and, more particularly, to a passive clutch cooling system to reduce drag loss between the interleaved friction discs and the clutch plates of a rotating clutch.

BACKGROUND

Rotational clutches are frequently used as one of the mechanisms for engaging or disengaging the various gear components of a transmission in order to establish different gear ratios between an input member and an output member. A conventional rotational clutch assembly typically includes a set of clutch plates and a set of friction discs, sometimes referred to as a clutch pack, interleaved between one another in a clutch housing. When the clutch assembly is disengaged, the clutch plates and friction discs normally turn past one another without contact. However, when the corresponding components of a particular clutch, i.e., a drive member and a driven member, are to be engaged during a particular gear range, for example, a hydraulically actuated or spring-loaded piston forces the clutch plates and friction discs together. Friction surfaces on the clutch plates and the friction discs interact until the drive member and the driven member of the clutch assembly rotate in unison without slip.

In operation, a great deal of thermal energy is generated during the engagement and disengagement of the clutch plates and the friction discs, as well as during the period of full engagement, when the kinetic energy generated by the engaged clutch pack is also translated into a large amount of thermal energy. This thermal energy must be dissipated to prevent damage to the various components of the clutch assembly, particularly the frictional surfaces of the clutch plates and the friction discs. A continuous supply of a coolant, such as transmission fluid, is typically supplied to the clutch housing to serve this purpose. In a rotational clutch assembly, the transmission fluid may be supplied to an inside diameter portion of the engaged clutch plates and the friction discs and allowed to flow by centrifugal force across the plate surfaces to an outside diameter portion. The hot transmission fluid is then directed away from the clutch assembly to pass through a heat exchange process for transfer and release of the thermal energy absorbed into the transmission fluid.

When the rotational clutch assembly is not engaged, the clutch plates and the friction discs simply rotate past one another without contact. During this period of disengagement, the amount of thermal energy that must be dissipated is minimal. Furthermore, simply maintaining a continuous flow of transmission fluid to the clutch pack during disengagement may also result in significant inefficiencies. For example, depending on the relative speed of the rotating drive member with respect to the disengaged, driven member, drag losses may be generated as a result of shear experienced by the transmission fluid between the clutch plates and the friction discs. The shear increases proportionally with the amount of transmission fluid provided to the clutch pack during disengagement. Thus, particularly in gears where the relative rotational speed differential between the clutch plates and the friction discs is highest, it is desirable to limit the flow of coolant to the clutch pack.

Various clutch cooling systems have been proposed to address controlling the flow of coolant to the clutch pack during engagement and disengagement. For example, U.S. Pat. No. 5,988,335 describes actively controlling the flow to the clutch with a diverter valve and a sensor arrangement to sense the gear ratio of the transmission and divert flow from the clutch assembly in response to the transmission being in a selected gear ratio. U.S. Pat. No. 6,244,407 proposes a more passive system that does not rely on a sensor actuated valve. Rather, an outer ring is mounted onto the piston used to actuate engagement of the clutch pack. The outer ring has an orifice provided therein for allowing a flow of coolant therethrough. The outer ring is movable between a first position wherein the orifice is closed and the drive and driven members are disconnected and a second position where the orifice is open to allow the flow of pressurized fluid through the orifice to the clutch pack when dictated by movement of the piston to engage the clutch plates and the friction discs. Other types of "slider valve" arrangements are common in the industry, wherein the piston moves the slider valve in a direction to uncover an orifice for increasing coolant flow to the clutch pack during engagement. Typically, a spring, for example, may be employed to close the slider valve over the orifice when the clutch disengages.

As described above, conventional clutch cooling systems can often be complex and/or require the addition of various components to provide a variable flow of coolant to the clutch pack. The increased complexity of these designs may add to the cost of manufacture, assembly, and maintenance of the transmission and creates additional opportunities for failure during operation. As such, a clutch cooling system is needed that eliminates the requirement for additional components while taking advantage of the natural operational characteristics of rotational clutch assemblies.

SUMMARY

The foregoing needs are met, to a great extent, by aspects of the present disclosure, wherein a transmission clutch cooling system includes a drive member including a drive hub situated about an axis of rotation, a driven member including a clutch hub concentrically situated about the axis of rotation, wherein the clutch hub includes a hub deck having a plurality of bores therethrough, an inner annulus extending axially from the hub deck, and an outer annulus extending axially from the hub deck, the outer annulus including a plurality of radial orifices therethrough and a lip flange extending from a distal end towards the inner annulus. A clutch housing is defined between the drive hub and the clutch hub, and a clutch assembly is housed in the clutch housing that includes a plurality of clutch plates secured to the drive hub to rotate with the drive member, a plurality of friction plates secured to the driven member to rotate with the clutch hub, and a piston assembly for engaging or disengaging the plurality of friction plates against the plurality of clutch plates to cause or release integrated rotation of the drive member and the driven member.

In accordance with other aspects of the present disclosure, a clutch hub includes a hub deck having a plurality of bores therethrough, an inner annulus extending axially from the hub deck, and an outer annulus extending axially from the hub deck, the outer annulus including a plurality of orifices therethrough and a lip flange extending from a distal end towards the inner annulus.

In accordance with yet other aspects of the present disclosure, a method of cooling a rotational clutch includes supplying a flow of coolant to an annular clutch hub having axial bores and radial holes, the radial holes being in fluid communication with a clutch pack, increasing the flow of coolant to the clutch pack through the radial holes during engagement of the clutch pack, and diverting a portion of the flow away from the clutch pack through the axial bores when the clutch pack is disengaged.

DETAILED DESCRIPTION

The disclosure will now be described with reference to the drawing figures, in which like reference numerals refer to like parts throughout.

Figure 1:
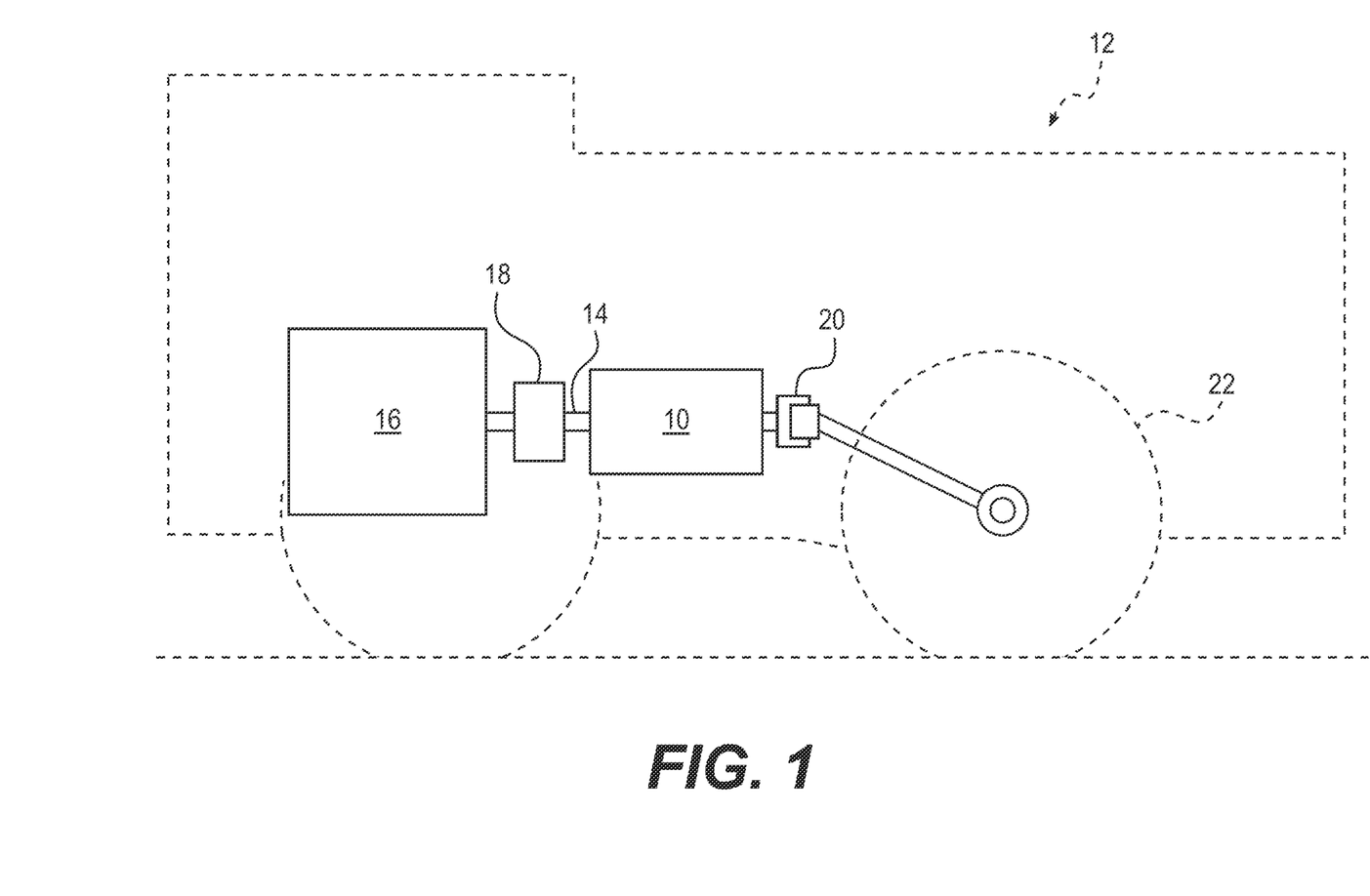
FIG. 1 is a diagrammatic illustration of a machine including a multi speed transmission, in accordance with aspects of the present disclosure.

Referring to FIG. 1, a multi-speed transmission 10 may be included in a machine 12. An input member 14 may connect the transmission 10 to a prime mover 16 by a torque converter 18, and an output member 20 may connect the transmission 10 to one or more traction devices 22. Although the machine 12 is shown as a truck, it may be any type of machine that may benefit from the use of a multi speed transmission. The prime mover 16 may be of any type that outputs power in a form usable by the multi-speed transmission 10. For example, the prime mover 16 may be an internal combustion engine (such as a diesel engine, a gasoline engine, a turbine engine or a natural gas engine), an electric motor, or other device capable of generating a power output. The traction devices 22 may be any type of traction devices, such as, for example, wheels as shown in FIG. 1, tracks, belts, or any combinations thereof.

Figure 2:
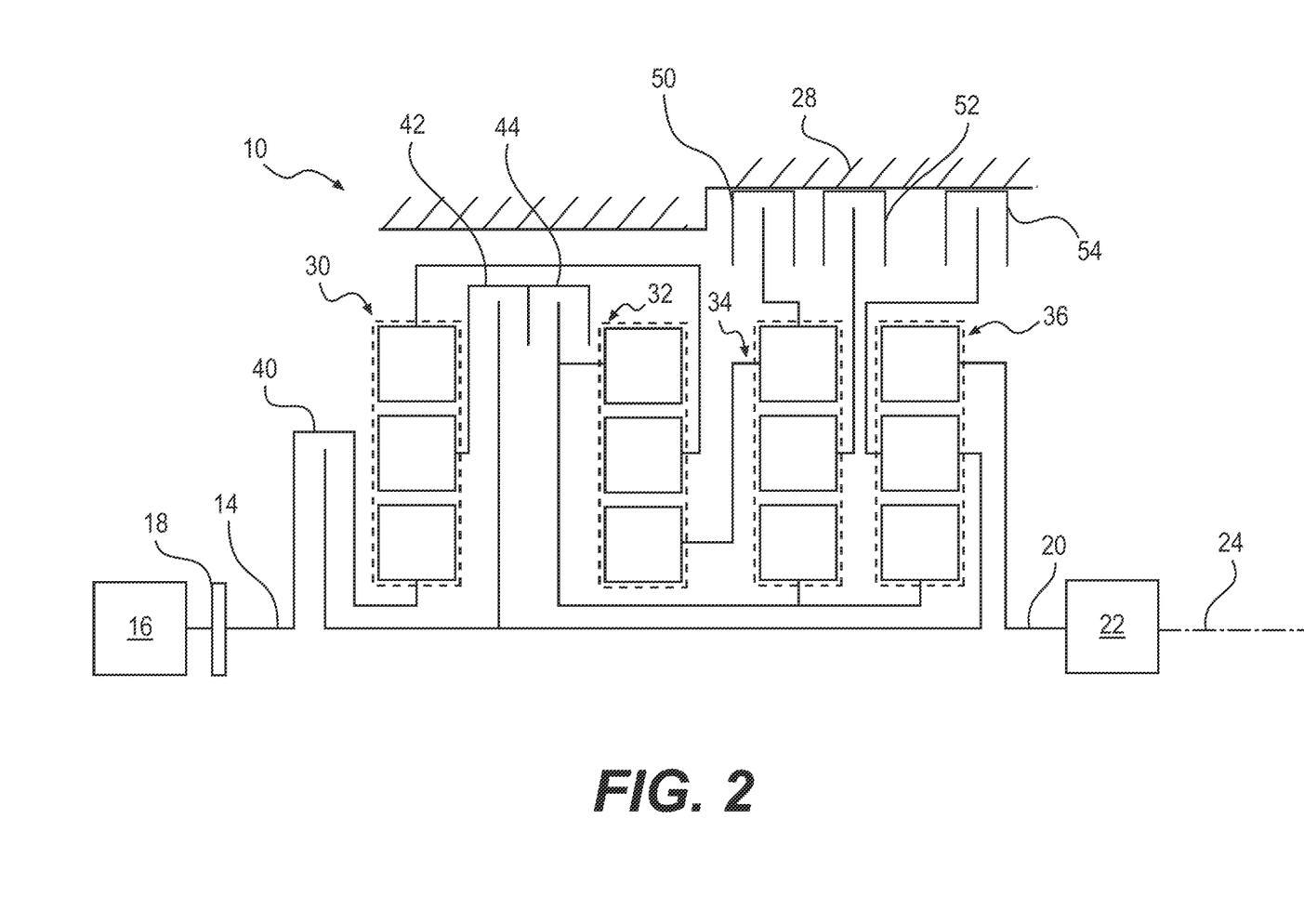
FIG. 2 is a schematic illustration of a transmission, in accordance with aspects of the present disclosure.

As shown in the schematic illustration of FIG. 2, the multi-speed transmission 10 may be a planetary transmission having a series of annular components rotatably supported and aligned about a rotational axis 24, the schematic illustrating aspects of the transmission on one side of the axis 24 only. Torque may be supplied to the input member 14 by the prime mover 16 through the torque converter 18, for example. At least one, and often a plurality of gear sets, may be interconnected between the input member 14 and the output member 20. As shown in FIG. 2, the multi-speed transmission 10 may have four interconnected planetary gear sets, 30, 32, 34 and 36 rotatably supported concentrically along the rotational axis 24 in a transmission casing 28. Each planetary gear set 30, 32, 34 and 36 includes at least one sun gear, at least one planetary carrier, and at least one ring gear.

The transmission 10 may also include a number of control elements operatively coupled to the planetary gear sets 30, 32, 34 and 36. As used herein, the term "control element" includes clutches (which are alternatively referred to in the industry as rotational clutches), brakes (which are alternatively referred to in the industry as stationary clutches), synchronizers (including dog and other types of synchronizing clutches) or other torque control components that may conventionally be used in a transmission. As shown in FIG. 2, the transmission 10 may include three rotational clutch assemblies 40, 42, and 44 and three brake assemblies 50, 52, and 54. The rotational clutch assemblies 40, 42, and 44 and brake assemblies 50, 52, and 54 cooperate with and may selectively couple particular elements of the planetary gear sets to establish, for example, a set of ten forward gear ratios and one reverse gear ratio between the input member 14 and the output member 20.

Figure 3:
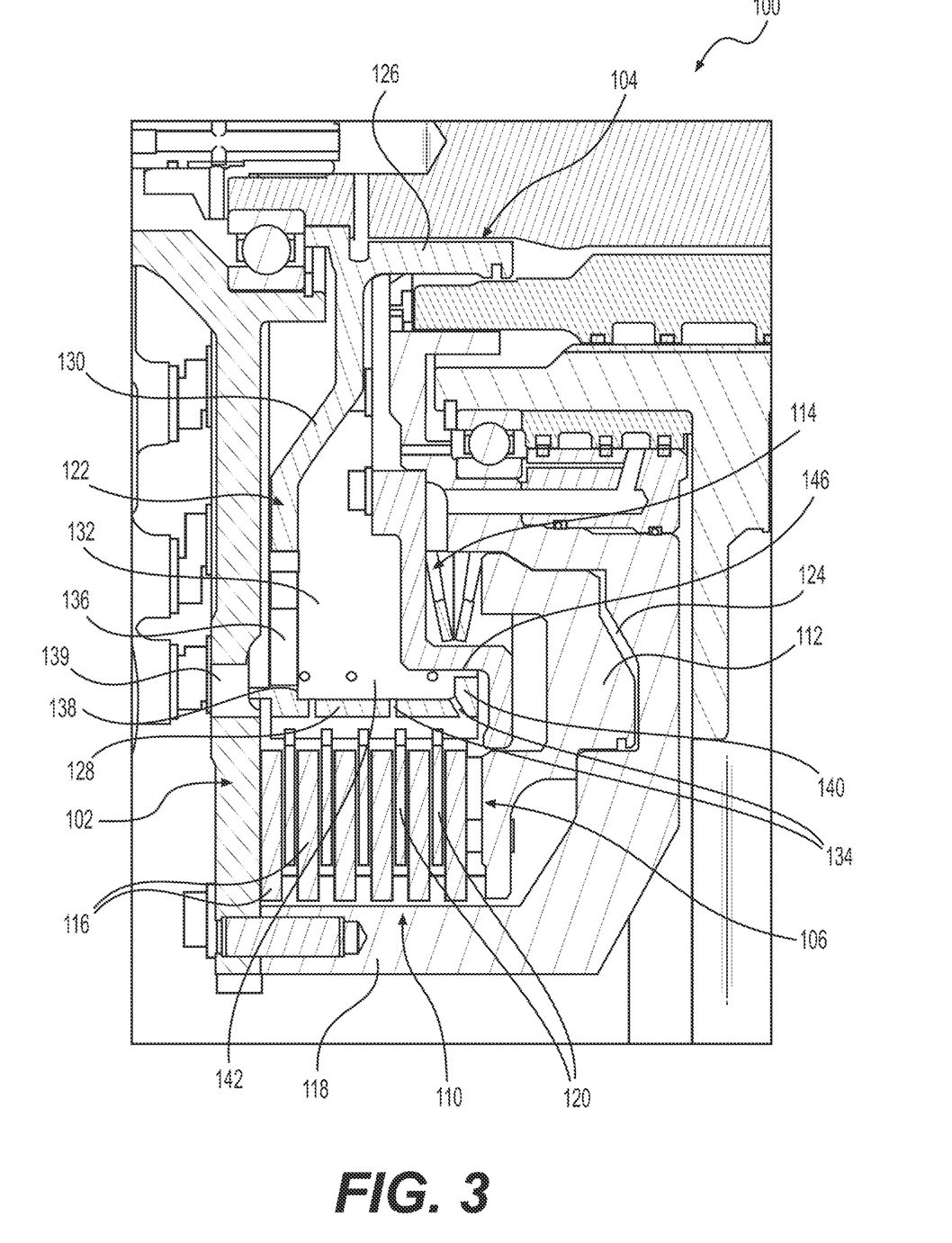
FIG. 3 is a partial cross-sectional side view of a clutch cooling system, in accordance with aspects of the present disclosure.

FIG. 3 illustrates a rotational clutch assembly 100 in accordance with aspects of the present disclosure. The rotational clutch assembly 100 may be used in the transmission 10, for example, as one or more of the rotational clutch assemblies 40, 42, and 44. The clutch assembly 100 may include a drive member, generally indicated at 102, and a driven member 104, generally indicated at 104, which rotate about a common axis. A clutch housing 106 is generally defined between the drive member 102 and the driven member 104 and is formed to house a clutch pack, generally indicated at 110, that is engaged or disengaged through actuation of a piston 112, such as through hydraulic actuation or spring force actuation. A balance piston assembly 114 may be included and housed in the clutch housing 106 along with the piston 112 in order to introduce reverse pressure on the low pressure side of the piston 112 to counteract the large thrust generated by the hydraulic pressure fluid on the high pressure side of the piston and prevent the piston from engaging the clutch at high rotational speeds.

The annular clutch pack 110 may be composed of annular clutch plates 116 that are splined to and extend inward from a drive hub portion 118 of the drive member 102 and annular friction discs 120 that are splined to and extend outward from a clutch hub 122 of the driven member 104. The clutch plates 116 and friction discs 120 are interleaved as shown in FIG. 3. In accordance with aspects of the present disclosure, when the clutch assembly 100 is in a disengaged position, the drive member 102 maintains a certain rotational speed based on an input speed of the input member 14 of the transmission 10 and the driven member 104 is disengaged and not rotating or rotating at a different relative speed. When the clutch assembly 100 is in the disengaged position, the clutch plates 116 rotate freely past the friction discs 120 in a non-contacting manner. However, when the clutch pack 110 is to be placed into an engaged position during a particular gear change, for example, when moving from the fifth gear to the sixth gear in the transmission 10 described previously, pressurized hydraulic fluid is introduced into a pressure chamber 124 to produce axial movement of the piston 112. In turn, actuation of the piston 112 forces a frictional engagement of the clutch plates 116 with the friction discs 120 to reduce or eliminate relative rotation between the clutch plates 116 and the friction discs 120.

As discussed above, during engagement of the clutch pack 110, the relative rotational speed of the drive member 102 and the driven member 104 may be synchronized. The frictional energy and kinetic energy generated by the engaged clutch pack 110 translates into a large amount of thermal energy that must be dissipated to reduce or eliminate wear or damage that may occur to the clutch plates 116 and the friction discs 120.

To facilitate cooling during this time, a continuous flow of coolant, such as automatic transmission fluid, may be provided to the clutch hub 122.

In accordance with aspect of the present disclosure, the clutch hub 122 may be formed with an inner annulus 126 connected to an outer annulus 128 by a hub deck 130. The inner annulus 126 and the outer annulus 128 extend from the hub deck 130 in a direction toward the piston 112 and cooperate with the shape of the hub deck 130 to form an interior space 132. The outer annulus 128 may be provided with a series of radial bores 134. The radial bores 134 provide fluid communication from the interior space 132 to the clutch pack 110 for a fluid to flow through the outer annulus 128 toward the clutch pack 110. Thus, when the clutch pack 110 is engaged to cause rotation of the clutch hub 122 at the same speed as the drive member 102, by way of centrifugal action, the transmission fluid is forced through the radial bores 134 and into the clutch pack 110 at an accelerated rate versus when the clutch pack is disengaged and motion of the transmission fluid into the clutch pack 110 is primarily by force of gravity. The radial bores 134 are sized to provide a maximum flow of coolant during a particular period of clutch engagement, for example, to provide sufficient cooling during engagement and disengagement between particular gears when thermal energy generation is greatest. Yet the radial bores 134 are also sized to restrict a majority of the coolant flow to the clutch pack 110 during a period of disengagement when centrifugal force is reduced or nonexistent.

Figure 4:
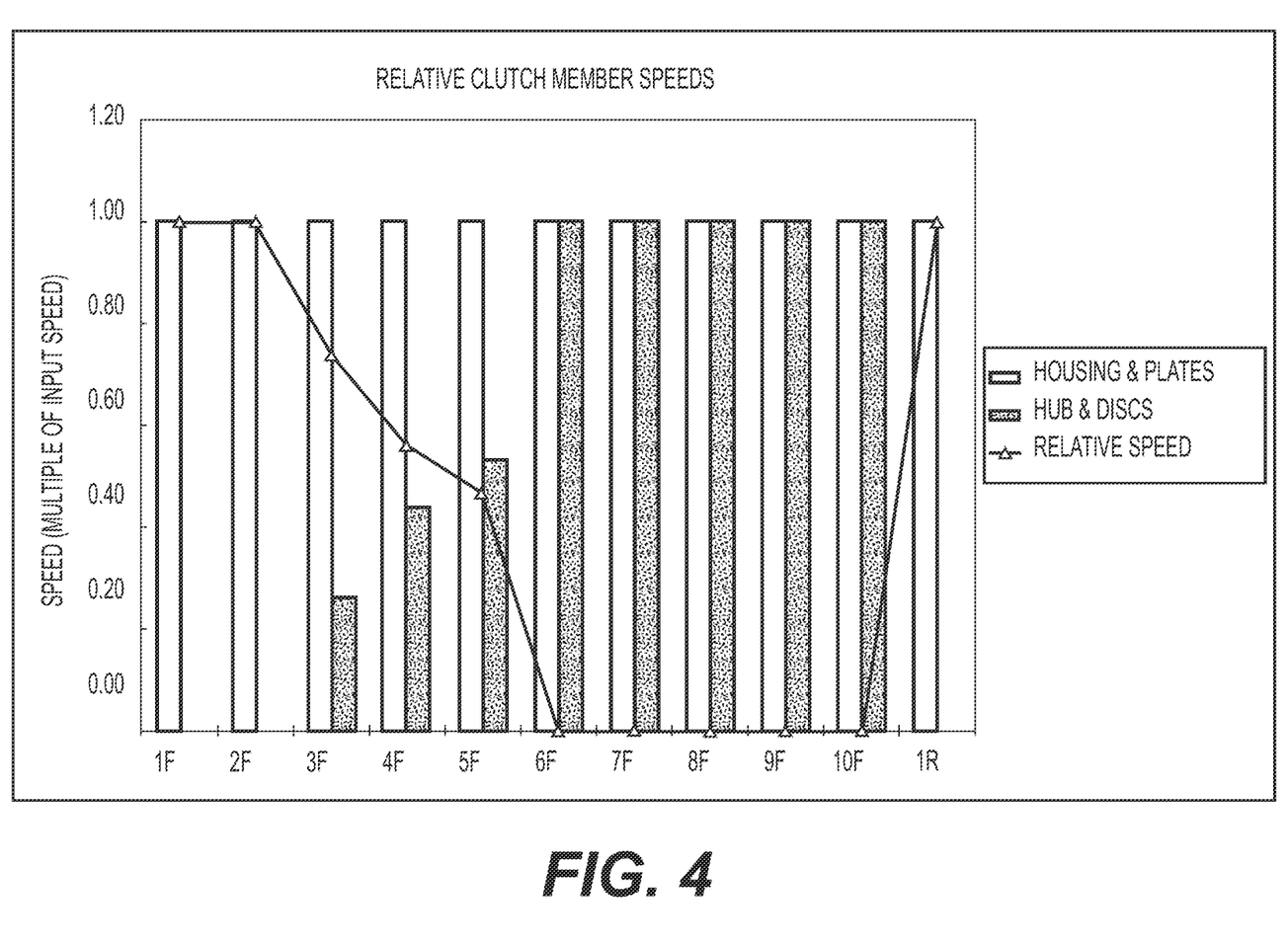
FIG. 4 is a chart illustrating rotational relative speed of a drive member and a driven member for a given set of gear ratios, in accordance with aspects of the present disclosure.

As explained above, the issue of providing sufficient cooling during engagement of the clutch assembly 100 can also lead to inefficiencies due to transmission fluid sheer during disengagement. FIG. 4 is a chart illustrating the relative speed difference between the constantly rotating drive member 102, including the clutch plates 116, and the driven member 104, including the friction discs 120, for a typical range of gears in a multi-speed transmission 10. The relative speed line indicates that the relative rotational speed between the driven member and the drive member is greatest in forward gears one (1F) and two (2F). In forward gears three (3F) through five (5F), the driven member 104 is controlled to increase speed relative to the drive member 102 until the clutch assembly 100 is engaged during a shift from gear 5F to forward gear six (6F) where it remains engaged through forward gear ten (10F). As illustrated by the chart, because the rotational speeds of the clutch plates 116 and the friction discs 120 are synchronized in gears 6F-10F, the difference in relative speed is zero. When the transmission is controlled to provide the reverse gear (R), the relative speed difference between the clutch plates 116 and the friction discs is again at its highest.

Figure 5:
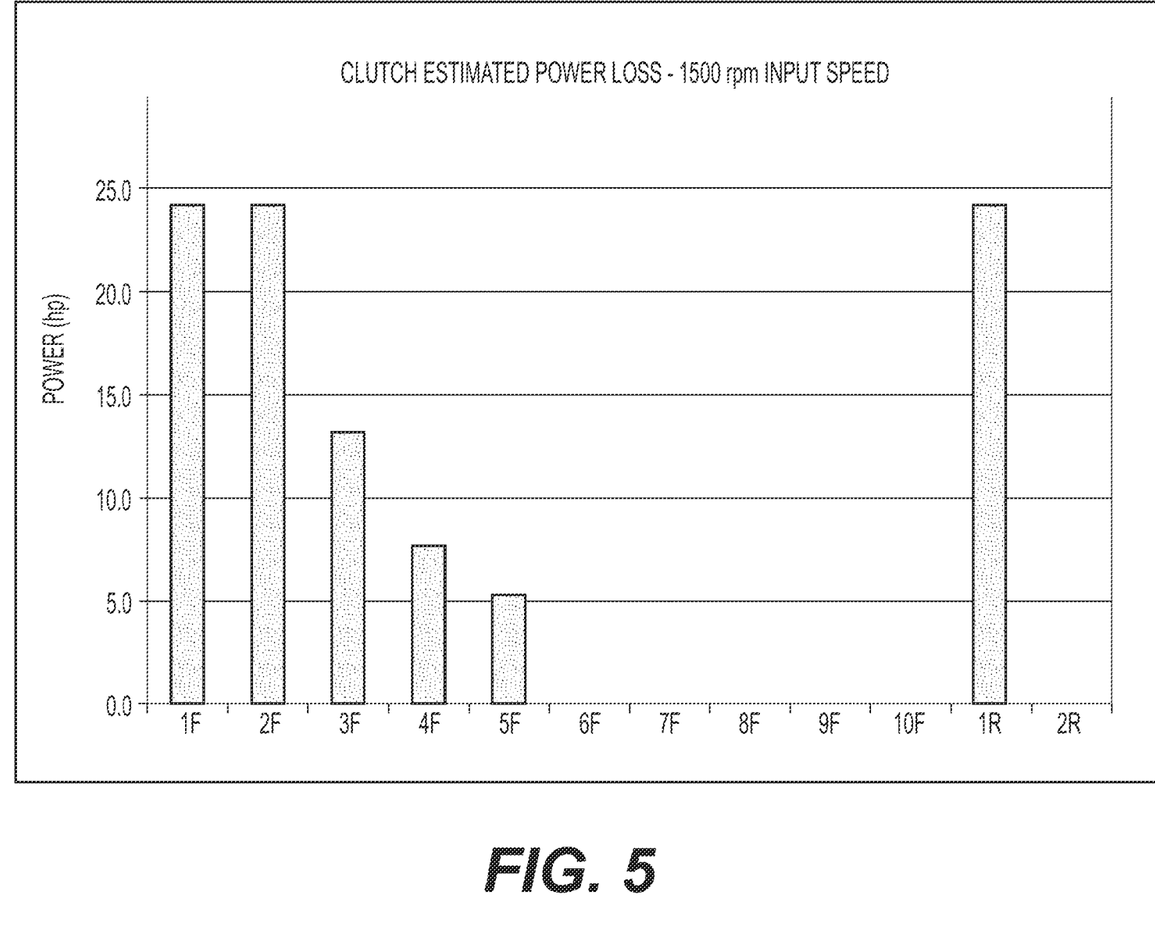
FIG. 5 is a bar graph illustrating estimated power loss in a clutch assembly for a given engine speed over a range of gears when transmission fluid flow to the clutch assembly is not restricted, in accordance with aspects of the present disclosure.

FIG. 5 is provided to illustrate the estimated power loss experienced as a result of the shearing of lubrication fluid in the clutch pack 110 if lubrication fluid is not diverted in accordance with aspects of the present disclosure. As shown by the chart, if the input speed of the transmission is maintained at a steady speed of, for example, 1500 rpm, the power losses are clearly highest in gears 1F, 2F and Reverse when the relative speed difference between the drive member 102 and the driven member 104 are highest, as illustrated in FIG. 4. Conversely, the power loss decreases successively in gears 3F-5F as the relative speed difference decreases until the power losses due to shearing are essentially zero in gears 6F-10F because of the concurrent rotation of the clutch plates 116 and the friction discs 120 with the clutch assembly 100 engaged. It should be noted that the particular power numbers shown in FIG. 5 may vary significantly for different transmissions depending on a number of factors, including the number and diameter of the clutch plates 116 and/or the friction discs 120, for example. However, the relative amounts of power loss experienced across the gear range, e.g., power loss being highest in gears 1F, 2F, and 1R, remains substantially as shown in FIG. 5.

Figure 6:
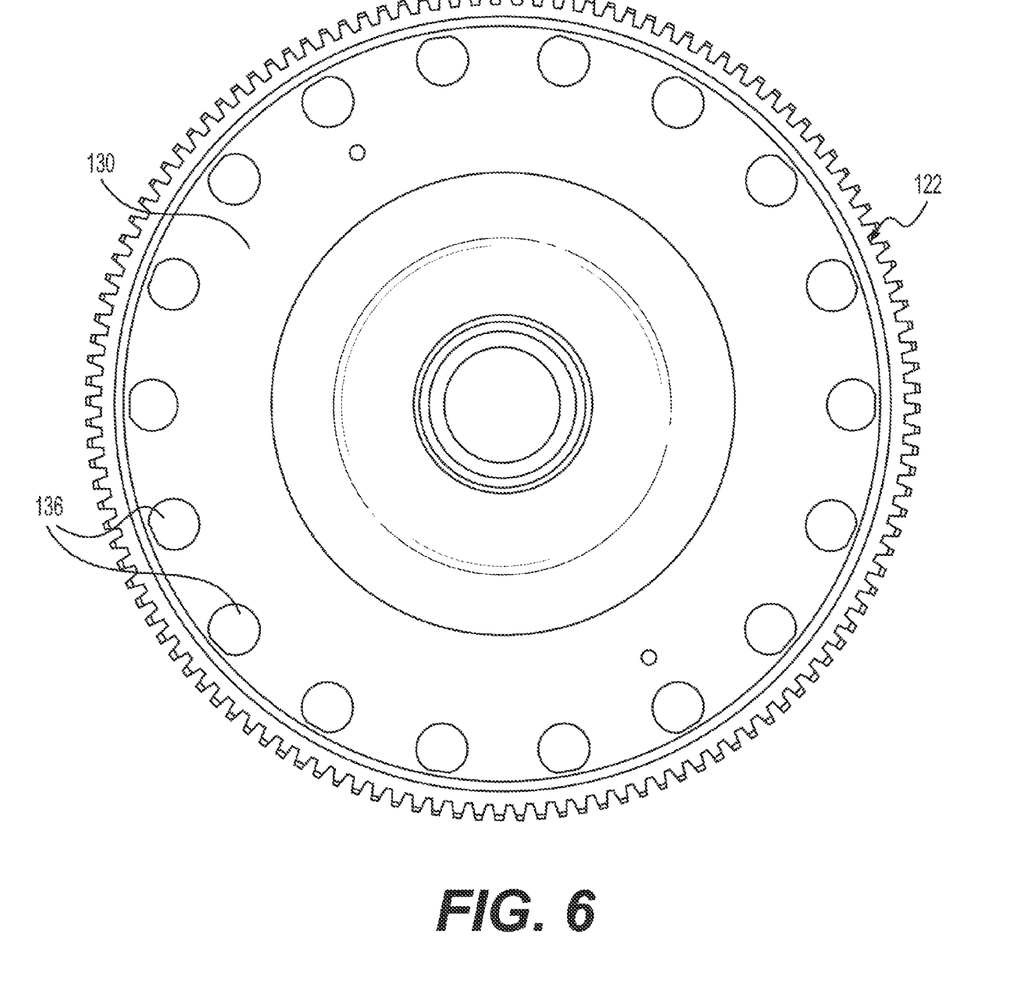
FIG. 6 is an axial view of a clutch hub component of a clutch cooling system, in accordance with aspects of the present disclosure.
Figure 7:
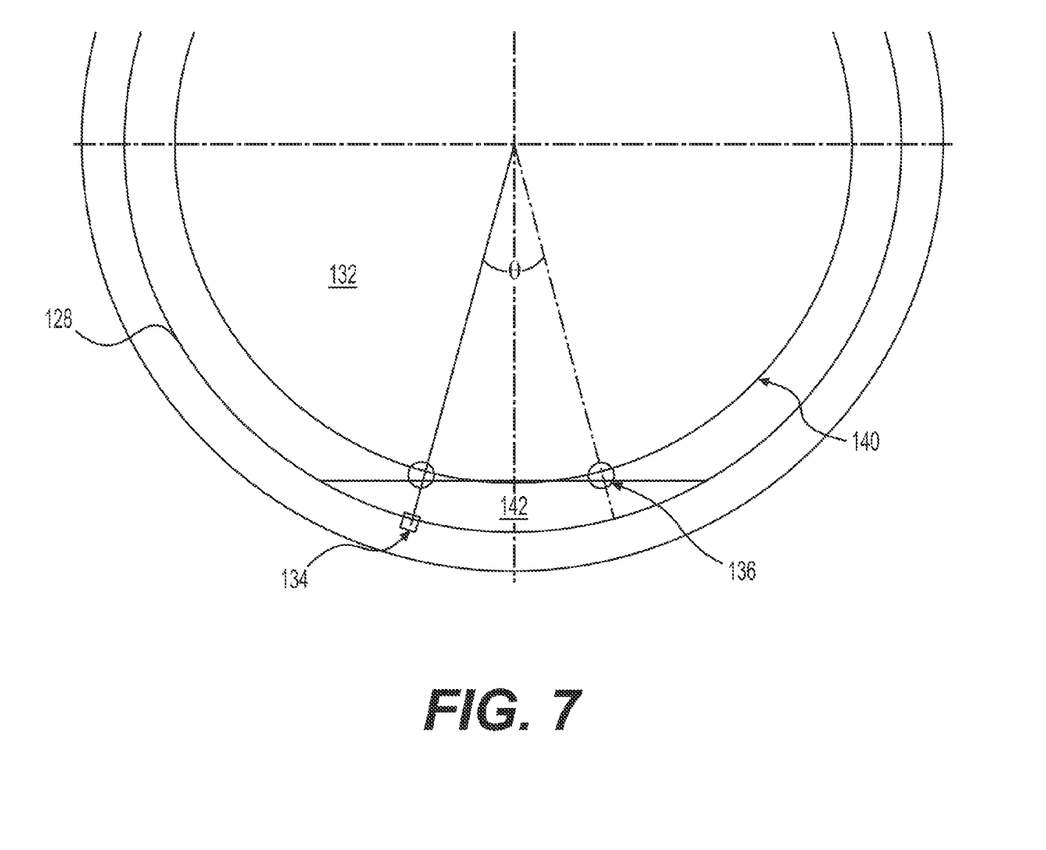
FIG. 7 is a partial cross-sectional side view illustrates aspects of a clutch cooling system, in accordance with aspects of the present disclosure.

As shown in FIGS. 6 and 7, a cooling system in accordance with aspects of the present invention may include a series of axial facing bores 136 provided in the hub deck 130 of the clutch hub 122. The axial facing bores 136 may be spaced peripherally toward an outside diameter of the hub deck 130 and sized to permit a substantial quantity of the flowing coolant to escape the interior space 132, primarily during a period of disengagement of the clutch assembly. Placement of the axial facing bores 136 near the outside diameter of the hub deck 130 also allows the clutch hub 122 to retain and direct a significant quantity of the flowing coolant toward and through the radial bores 134 during the period of engagement to lubricate and cool the clutch pack 110. Lengthening the run of fluid flow allows development of a significant amount of centrifugal force to act on the fluid as it flows toward the radial bores 134.

Referring back to FIG. 3, a lip flange 140 may be provided toward a distal end of the outer annulus 128 to extend a predetermined distance toward the inner annulus 126. The axial bores 136 may be displaced radially inward from an inner diameter of the outer annulus 128 to create a step 138. The lip flange 140 may be formed to extend toward the inner annulus 126 a distance greater than the radial dimension of the step 138. Accordingly, a trough area 142 is formed in the outer annulus 128 between the step 138 and the lip flange 140 to maintain a small amount of coolant in the trough area 142 when the clutch hub 122 is not rotating or is rotating slowly. Thus, even during a period of clutch disengagement, although a majority of the coolant fluid flow is able to drain out of the interior space 132 through the axial bores 136, the radial bores 134 may be appropriately dimensioned to allow an appropriate amount of coolant to drain by force of gravity from the trough area 142 into the clutch pack 110. Thus, a minimal amount of fluid flow may be established during disengagement of the clutch assembly 100, enough of a fluid flow from the interior space 132 to the clutch pack 110 to maintain viability and efficiency of the moving components without introducing the inefficiencies of shear caused by excessive fluid flow during the period of disengagement. As shown in FIG. 3, through-holes 139, for example, may be provided in a housing component of the drive member for further routing of the fluid flow away from the clutch assembly.

FIGS. 6 and 7 illustrate that the axial bores 136 may be arcuately spaced at equal angles θ around the perimeter of the hub deck 130 such that at least a portion of one or more of the axial bores 136 will always be below the fluid level in the trough area 142 formed in the outer annulus 128 of the clutch hub 122 when the clutch hub 122 is not rotating, i.e., when the clutch pack 110 is disengaged. Accordingly, when the clutch hub 122 is stopped and the relative speed between the clutch plates 116 and the friction discs 120 is highest, such as in gears 1F, 2F and R, for example, the larger axial bores 136 are configured to drain away a majority of the transmission fluid and the smaller radial bores 134 are configured to allow only a select quantity of transmission fluid into the clutch pack 110. Similarly, when the clutch hub 122 of the driven member 104 begins to rotate faster relative to the drive hub portion 118 of the drive member 102, such as in gears 3F-5F, or when the the clutch assembly 100 is engaged in gears 6F-10F, centrifugal force will once again operate to pump the transmission fluid through the outer annulus 128 and into the clutch pack 110.

In accordance with yet other aspects of the present disclosure, a seal (not shown) may be provided to close a gap 146 that may exist between the lip flange 140 and components of the driven member 104, such as the balance piston 114 (see FIG. 3), if it is determined that excess amounts of transmission fluid are spilling over the lip flange 140 into the clutch pack 110 during the disengagement period of the clutch assembly 100.

Figure 8:
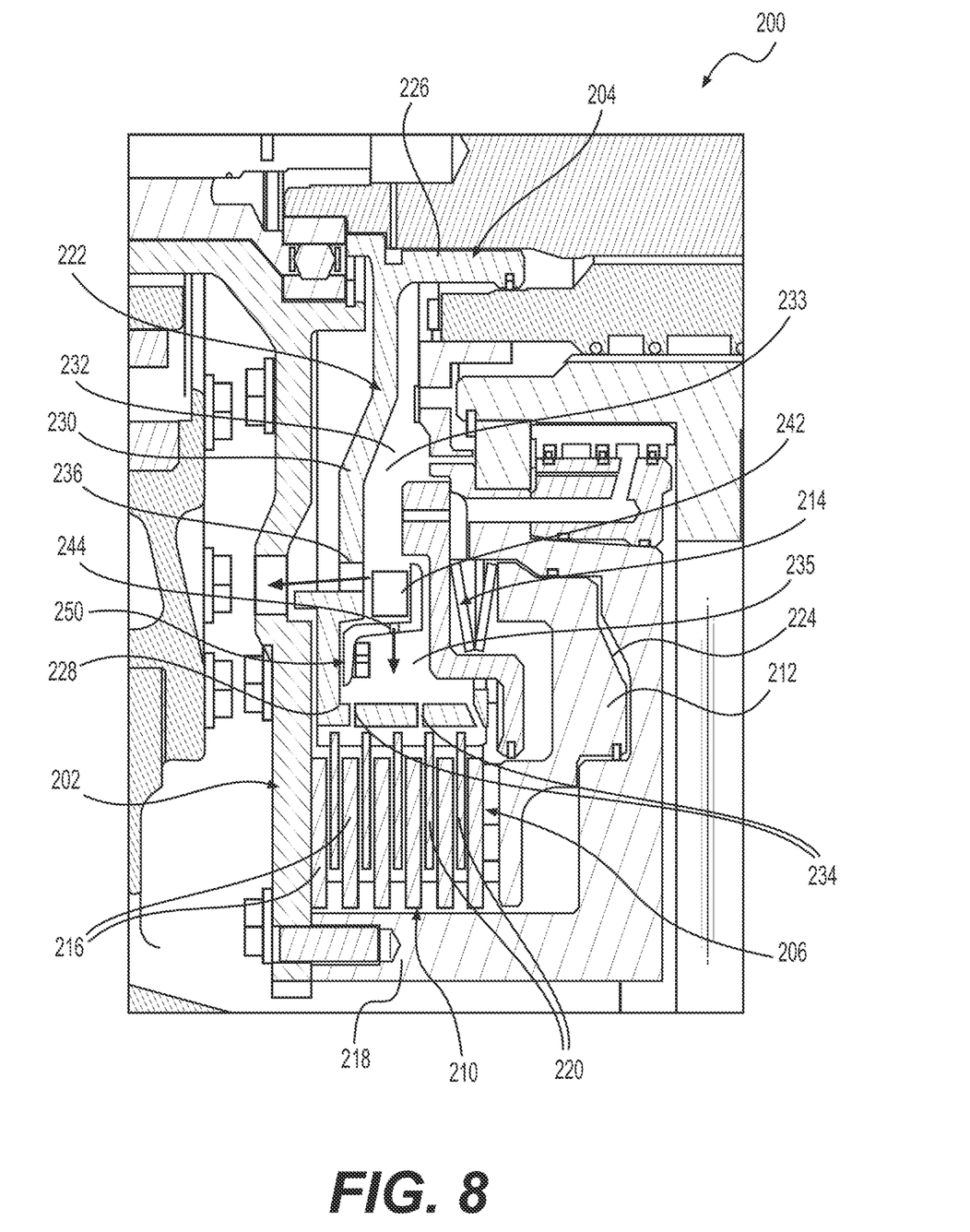
FIG. 8 is a partial cross-sectional side view illustrating aspects of a clutch cooling system, in accordance with aspects of the present disclosure.

FIG. 8 illustrates a rotational clutch assembly 200 in accordance with yet other aspects of the present disclosure. The rotational clutch assembly 200 may be used in the transmission 10, for example, as one or more of the rotational clutch assemblies 40, 42, and 44. The clutch assembly 200 may include a drive member, generally indicated at 202, and a driven member, generally indicated at 204, which rotate about a common axis. A clutch housing 206 is generally defined between the drive member 202 and the driven member 204 and is formed to house a clutch pack, generally indicated at 210, that is engaged or disengaged through actuation of a piston 212, such as through hydraulic actuation or spring force actuation. A balance piston assembly 214 may be included and housed in the clutch housing 206 along with the piston 212 in order to introduce reverse pressure on the low pressure side of the piston 212 to counteract the large thrust generated by the hydraulic pressure fluid on the high pressure side of the piston and prevent the piston from engaging the clutch at high rotational speeds.

The annular clutch pack 210 may be composed of annular clutch plates 216 that are splined to and extend inward from a drive hub portion 218 of the drive member 202 and annular friction discs 220 that are splined to and extend outward from a clutch hub 222 of the driven member 204. The clutch plates 216 and friction discs 220 are interleaved as shown in FIG. 8. In accordance with aspects of the present disclosure, when the clutch assembly 200 is in a disengaged position, the drive member 202 maintains a certain rotational speed based on an input speed of an input member of the transmission 10 and the driven member 204 is disengaged and not rotating or rotating at a slower relative speed. When the clutch assembly 200 is in the disengaged position, the clutch plates 216 rotate freely past the friction discs 220 in a non-contacting manner. However, when the clutch pack 210 is to be placed into an engaged position during a particular gear change, for example, when moving from the fifth gear to the sixth gear in the transmission 10 described previously, pressurized hydraulic fluid is introduced into a pressure chamber 224 to produce axial movement of the piston 212. In turn, actuation of the piston 212 forces a frictional engagement of the clutch plates 216 with the friction discs 220 to reduce or eliminate relative rotation between the clutch plates 216 and the friction discs 220.

As discussed above, during engagement of the clutch pack 210, the relative rotational speed of the drive member 202 and the driven member 204 may be synchronized. To facilitate cooling during transition to and from an engaged state, and to reduce the transferred kinetic energy while the members are engaged, a continuous flow of coolant, such as automatic transmission fluid, may be provided to the clutch hub 222. In accordance with aspects of the present disclosure, the clutch hub 222 may be formed with an inner annulus 226 connected to an outer annulus 228 by a hub deck 230. The inner annulus 226 and the outer annulus 228 extend from the deck 230 in a direction toward the piston 212 and cooperate to form an interior space 232. The outer annulus 228 may be provided with a series of radial bores 234 that provide fluid communication from the interior space 232 to the clutch pack 210 for a fluid to flow through the outer annulus 228 toward the clutch pack 210.

A slinger plate 250 may be mounted to the hub deck 230 and configured to divide the interior space 232 into an upper space 233 and a lower space 235 while providing a trough 242 for collecting transmission fluid pumped into the interior space 232. A series of axial facing bores 236 may be provided in the hub deck 230 of the clutch hub 222. The axial facing bores 236 are spaced peripherally a radial distance from the center of the hub deck 230 and just above where the slinger plate 250 divides the interior space 232. The axial bores 236 are sized to permit a substantial quantity of the flowing coolant to escape the upper space 233, primarily during a period of disengagement of the clutch assembly 200.

The slinger plate 250 is also provided with a series of radially situated slinger bores 244 at the bottom of the trough 242. The slinger bores 244 provide fluid communication from the upper space 233 to the lower space 235 for the transmission fluid to flow therethrough. Thus, when the clutch pack 210 is engaged to cause rotation of the clutch hub 222 at the same speed as the drive member 202, or during a period when rotation of the driven member 204 is increased relative to the rotation of the drive member 202, such as in gears 3F-10F, by way of centrifugal action transmission fluid is forced through the slinger bores 244 and into the lower space 235. Once in the lower space 235, the transmission fluid may continue under centrifugal force to flow through the radial bores 234 into the clutch pack 210. The size of the slinger bores 244 and the radial bores 234 are determined in order to restrict a majority of the coolant flow to the lower space 235 and thus the clutch pack 210 during a period of disengagement, when most of the transmission fluid is intended to drain from the trough 242 by way of the axial bores 236.

The axial bores 236 may be arcuately spaced at equal angles θ around the perimeter of the hub deck 230 such that at least a portion of one or more of the axial bores 236 will always be below the fluid level in the trough area 242 when the clutch hub 222 is not rotating, i.e., when the clutch pack 210 is disengaged. Accordingly, when the clutch hub 222 is stopped and the relative speed between the clutch plates 216 and the friction discs 220 is highest, such as in gears 1F, 2F, or R, the larger axial bores 236 may drain away a majority of the coolant before the coolant drains through the slinger bores 244 and the radial bores 234 into the clutch pack 210. Once the clutch assembly 200 is engaged and/or the clutch hub 222 starts to rotate, the slinger bores 244 and the radial bores 234 will work again to pump the transmission fluid into the clutch pack 210 to provide adequate removal of the thermal heat generated therein.

Various aspects of systems and methods for cooling a clutch assembly may be illustrated by describing components that are connected, attached, and/or joined together. As used herein, the terms "connected", "attached", and/or "joined" are used to indicate either a direct connection between two components or, where appropriate, an indirect connection to one another through intervening or intermediate components. In contrast, if a component is referred to as being "directly coupled", "directly attached", and/or "directly joined" to another component, there are no intervening elements present.

Industrial Applicability

The disclosure includes a clutch cooling system and methods for cooling a clutch that include passively controlling the flow of coolant to a clutch pack in the clutch. The cooling system efficiently transfers thermal energy generated by the engagement and disengagement of the clutch pack while reducing drag losses of the clutch assembly when the clutch is disengaged. The clutch cooling system is disclosed for use in transmissions on vehicles, including heavy haul trucks or ground moving equipment, for example, but may be used in any machine that uses clutches for the engagement and disengagement of component members.

In a rotational clutch having a drive member and a driven member, the clutch cooling system employs a unitary clutch hub attached to the driven member that has axial bores and radial holes, the radial holes being in fluid communication with a clutch pack and the axial bores providing an outlet from the clutch assembly. Through placement and sizing of the axial bores and the radial holes, passive cooling control depends simply on the rotational speed of the clutch hub by increasing a flow of coolant to the clutch pack through the radial holes during engagement of the clutch pack, when the clutch hub is rotating, while diverting a larger portion of the flow away from the clutch pack via the axial bores when the clutch pack is disengaged, when the clutch hub is not rotating or rotating at a much slower speed.

The many features and advantages of the disclosure are apparent from the detailed specification, and, thus, it is intended by the appended claims to cover all such features and advantages of the disclosure which fall within the true spirit and scope of the disclosure. Further, since numerous modifications and variations will readily occur to those skilled in the art, it is not desired to limit the disclosure to the exact construction and operation illustrated and described, and, accordingly, all suitable modifications and equivalents may be resorted to that fall within the scope of the disclosure.

What is claimed is:

1. A transmission clutch cooling system comprising:
   a drive member including a drive hub situated about an axis of rotation;
   a driven member including a clutch hub concentrically situated about the axis of rotation, wherein the clutch hub includes a hub deck having a plurality of bores therethrough, an inner annulus extending axially from the hub deck, and an outer annulus extending axially from the hub deck, the outer annulus having a plurality of radial orifices therethrough and a lip flange extending from a distal end towards the inner annulus;
   a clutch housing defined between the drive hub and the clutch hub; and
   a clutch assembly housed in the clutch housing and including:
      a plurality of clutch plates secured to the drive hub to rotate with the drive member;
      a plurality of friction plates secured to the driven member to rotate with the clutch hub; and
      a piston assembly for engaging or disengaging the plurality of friction plates against the plurality of clutch plates to cause or release integrated rotation of the drive member and the driven member,
   wherein the plurality of bores are displaced radially inward of an inner diameter surface of the outer annulus to create a step, the step forming a radially outer edge of a respective bore of the plurality of bores that is offset from the inner diameter surface on a side of the lip flange.

2. The transmission clutch cooling system of claim 1, wherein the lip flange is formed to extend toward the inner annulus a distance greater than the radial dimension of the step.

3. The transmission clutch cooling system of claim 2, further comprising a coolant fluid continuously supplied to an interior space defined by the hub deck, the inner annulus, and the outer annulus of the clutch hub.

4. The transmission clutch cooling system of claim 3, wherein the plurality of radial orifices are sized to restrict flow of the coolant fluid to the clutch housing when the plurality of friction plates and the plurality of clutch plates are disengaged while permitting an increased flow of the coolant fluid to the clutch housing when the plurality of friction plates and the plurality of clutch plates are engaged.

5. The transmission clutch cooling system of claim 4, wherein the plurality of bores are arcuately spaced at equal angles around a perimeter of the hub deck such that at least a portion of one or more of the bores is always below a predetermined fluid level of coolant fluid pooled between the step and the lip flange during disengagement.

6. The transmission clutch cooling system of claim 4, further comprising a seal provided in a gap between the lip flange and a component of the driven member.

7. The transmission clutch cooling system of claim 1, further comprising:
   a coolant fluid continuously supplied to an interior space defined by the hub deck, the inner annulus, and the outer annulus of the clutch hub, and
   a slinger plate attached to the clutch hub and dividing the interior space into an upper space and a lower space, the slinger plate having a plurality of slinger bores.

8. The transmission clutch cooling system of claim 7, wherein the plurality of slinger bores extend radially to provide fluid communication from the upper space to the lower space.

9. The transmission clutch cooling system of claim 3, wherein the coolant fluid is automatic transmission fluid.

10. A clutch hub comprising:
    a hub deck having a plurality of bores therethrough;
    an inner annulus extending axially from the hub deck, and
    an outer annulus extending axially from the hub deck, the outer annulus including a plurality of orifices therethrough and a lip flange extending from a distal end towards the inner annulus,
    wherein the plurality of bores are displaced radially inward of an inner diameter surface of the outer annulus to create a step, the step forming a radially outer edge of a respective bore of the plurality of bores that is offset from the inner diameter surface on a side of the lip flange, and
    wherein at least one bore of the plurality of bores drains fluid flow away from the clutch assembly.

11. The clutch hub of claim 10, wherein the lip flange is formed to extend toward the inner annulus a distance greater than the radial dimension of the step.

12. The clutch hub of claim 10, wherein the plurality of orifices are sized to allow an increased flow of fluid therethrough when the clutch hub is rotating.

13. The clutch hub of claim 11, wherein the plurality of bores are arcuately spaced at equal angles around a perimeter of the hub deck such that at least a portion of one or more of the plurality of bores is always below a predetermined fluid level of a coolant fluid when contained by the step and the lip flange while the clutch hub is not rotating.

14. The clutch hub of claim 10, further comprising a slinger plate attached to the clutch hub, the slinger plate having a plurality of slinger bores extending radially.

15. A method of cooling a rotational clutch comprising:
    supplying a flow of coolant to an annular clutch hub having a plurality of axial bores and radial holes, the radial holes being in fluid communication with a clutch pack;
    increasing the flow of coolant to the clutch pack through the radial holes during engagement of the clutch pack; and
    diverting a portion of the flow away from the clutch pack through the axial bores when the clutch pack is disengaged, the plurality of axial bores being displaced radially inward of an inner diameter surface of an outer annulus of the clutch hub to create a step.

16. The method of cooling a rotational clutch of claim 15, further comprising:
collecting an amount of the coolant in a trough formed in a portion of the clutch hub, wherein the radial holes provide fluid communication from the trough to the clutch pack.

17. The method of cooling a rotational clutch of claim 16, further comprising:
sizing the radial holes to restrict the flow from the trough to the clutch pack when the clutch pack is disengaged while permitting an increased flow of coolant to the clutch pack when the clutch pack is engaged.

18. The method of cooling a rotational clutch of claim 16, wherein the axial bores are arcuately spaced at equal angles around a perimeter of an axially facing portion of the clutch hub such that at least a portion of one or more of the axial bores is always below a fluid level of the coolant in the trough when the clutch pack is disengaged.

19. The method of cooling a rotational clutch of claim 15, wherein the coolant is automatic transmission fluid.

20. The method of cooling a rotational clutch of claim 15, further comprising:
attaching a slinger plate to the clutch hub to divide an interior of the clutch hub into a first space and a second space, the axial bores providing fluid communication to the first space and the radial holes providing fluid communication between the second space and the clutch pack,
wherein the slinger plate has a plurality of slinger bores extending radially.

* * * * *